Feb. 5, 1946. S. J. BLUMENTHAL 2,393,959
SPECTACLES
Filed Dec. 24, 1942
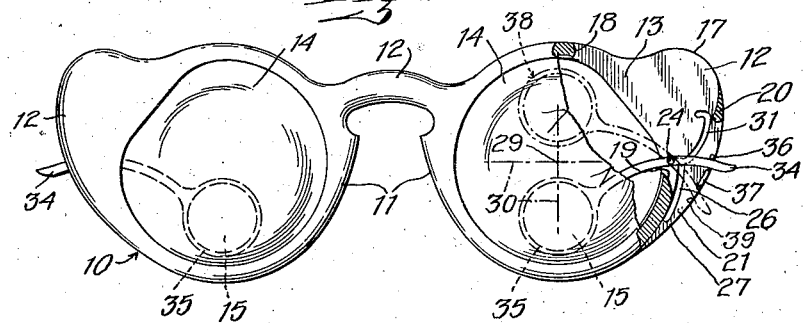
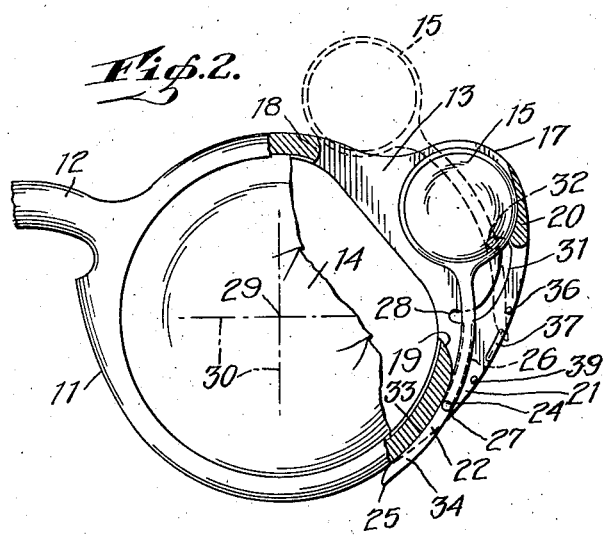
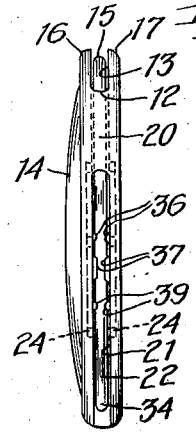
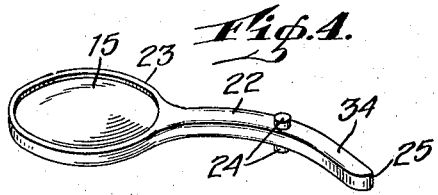
INVENTOR
SAMUEL J. BLUMENTHAL
BY
ATTORNEY Patented Feb. 5, 1946

2,393,959

UNITED STATES PATENT OFFICE 2,393,959

SPECTACLES

Samuel J. Blumenthal, Brooklyn, N. Y.

Application December 24, 1942, Serial No. 470,319

11 Claims. (Cl. 88—41)

This invention relates to spectacles, sometimes commonly referred to as eyeglasses. More particularly, the invention relates to devices of this kind of what I term multifocal type, that is to say, wherein each lens section of the spectacle has means providing within the focal range thereof means for producing a plurality of focal ranges, and particularly in accomplishing this result by the use of two pairs of lenses, the lenses in each pair being relatively movable.

The novel features of the invention will be best understood from the following description when taken together with the accompanying drawing, in which certain embodiments of the invention are disclosed, and in which the separate parts are designated by suitable reference characters in each of the views, and in which:

Fig. 1 is a face view of a pair of spectacles made according to my invention with parts of the construction broken away and in section.

Fig. 2 is a view similar to Fig. 1, showing only a part of the construction on an enlarged scale and with parts in a different position.

Fig. 3 is an edge view of the structure as seen in Fig. 2, and

Fig. 4 is a perspective view of one part of the structure shown in Figs. 1 to 3 inclusive, detached.

In the construction of lenses of eyeglasses or spectacles, it has been common to employ what is commonly referred to as bifocals, and in some instances trifocal lenses have been used. In all of these instances, lenses of this kind have been objectionable in use and oftentimes result in injury to the wearer by reason of the awkwardness and impracticability of definite location and arrangement of the different lens structure. Further attempts have been made to provide movable lenses or two lenses, one movable relatively to the other to overcome the above objectionable features. In such cases, the movable lens has been restricted to movement into one focusing position.

It is the object of my invention to provide a spectacle structure wherein the lens mounting is provided with means for supporting one large lens controlling normal vision or what might be termed far sighted vision, and then to movably support in the spectacle or lens mounting frame two smaller lenses, movable in the frame to a pivotal position enabling the smaller lenses to move into at least two different focal positions properly centered on the first lenses in providing two other visions for the wearer.

The two additional visions are what might be termed a downward or reading vision and an upward vision. Further, means is provided for supporting the secondary lenses within housing portions on the spectacle frame when not in use, and means is also provided to retain the secondary lenses in different positions with respect to the primary lenses when in use, as well as to extend the secondary lenses beyond the limits of the spectacle frame when it is desired to clean said secondary lenses.

It will be understood that my invention is applicable for use on spectacle frames of various kinds and classes. In Fig. 1 of the drawing, one adaptation and use of the invention is disclosed, and in this figure a frame 10 is employed comprising two lens supporting rings or loops 11, joined by a bridge or nosepiece 12 and suitable ear engaging bows may be provided, but as these form no part of the present invention, the showing thereof is omitted.

The lens engaging loops or rings 11 differ from conventional supports of this kind in having at upper outer corner portions thereof enlarged hollow bodies 12. The body 12 projects rearwardly so that the channel 13 of this body is disposed rearwardly of the normal or primary lens 14. It will thus be seen that a secondary lens 15 which is normally housed in the channel 13 is free to be moved over the rear surface of the lens 14.

The channel 13 is closed by front and rear plates 16 and 17, note Fig. 3 of the drawing, and opens through the top of the body 12, as well as inwardly in the direction of the lens 14, the last opening being bordered by the terminal ends 18 and 19 of the frame.

The walls 16 and 17 are joined as indicated at 20, and these walls extend downwardly along outer edges of the frames 11, forming recesses or channels 21, in which lever portions 22 of ring like frames 23 are free to pass. The frames 23 support the lenses 15, as clearly seen in Fig. 4 of the drawing. It will be apparent that the lenses 15 may be made relatively large, thus providing a wide range of vision in the different positions assumed thereby.

Each lever 22 has centrally thereof oppositely directed pivot pins 24 and the free ends of the levers are curved, as seen at 25 to provide gripping ends facilitating swinging movement of the secondary lenses, as later described.

Opposed walls of the channels 21, or in other words, adjacent surfaces of the walls 16 and 17 are provided with grooves 26, which extend from a normal bottom stop 27 to a pivot or fulcrum stop 28, disposed in horizontal alinement with the focal center 29 of the lens 14, as indicated by the dot and dash lines 30 in Fig. 2 of the drawing. Extending outwardly and upwardly from the pivot or axis 28 is an extension 31 of the groove 26 which also has an offset pivot 32 to support the lens 15 in the position projected beyond the limits of the spectacle frame to facilitate cleaning of the lens.

It will be understood that the pivot pins 24 operate in the grooves 26, 31, and the pivots 28, 32, in the movement of the lens 15 into different positions.

Normally, the lens 15 is supported in the hood body 12, or within the channel 13 thereof, with the pins 24 engaging the stop end 27 of the grooves 26 in which position the lever 22 rests, as seen at 33, upon the base of the groove or channel 21 with the curved end 25 of the lever projecting slightly beyond the limits of the ring frame 11, thus the nail of one finger is free to engage the end 25 to move the lens 15 into different positions.

In moving the lens 15 to a normal bifocal position for reading and similar purposes, the finger piece end 34 of the lever 22 is first swung outwardly, using the stop 27 as a pivot to swing the lens 15 inwardly and rearwardly of the lens 14, after which the lever is moved upwardly along the outer side of the frame to bring the pivot pins 24 to the pivot 28, at which time the lever is moved inwardly and then the lever is manipulated to move the lens 15 into the lower bifocal position indicated at 35 in Fig. 1 of the drawing. In this position, the lens is supported against accidental displacement by the engagement of the end portion 34 between two pairs of beads 36 and 37 on adjacent surfaces of both walls 16 and 17.

It will be understood that sufficient spring properties will be provided in the walls 16 and 17 to allow the lever to frictionally pass over the beads, but these beads are sufficient to retain the lens 15 in the position indicated at 35.

When it is desired to swing the lens 15 into the raised bifocal position as indicated at 38, in Figure 1, the lever end 34 is swung between the pair of beads 37, and another pair of beads 39, and here again the lens 15 will be retained against accidental displacement. In both positions 35, 38 of the lens 15, the focal center of the lens will be in vertical alinement with the focal center 29 of the primary lens 14.

The structure as shown and described illustrates one adaptation and use of the invention, but it will be understood that this use is only one of the possible uses and possibly one of the more conventional uses of the invention. In some instances, the positioning of the secondary lenses may be varied to suit any abnormal condition of the eyes and in this respect may be used as a means for correcting improper vision.

In the present illustration details of construction are not dealt with from the standpoint of assemblage of the various parts, particularly in that this can be accomplished in many ways. It will be apparent, however, that with a construction of the type and kind illustrated, interchanging of primary as well as secondary lenses may be made from time to time in caring for variances in the vision of one person. Furthermore, from the standpoint of manufacture, certain standards can be adapted in the construction of the lens frames and the primary lenses, to which may be added the various types and kinds of secondary lenses made to prescribe the required correction needed for reading or close-up work of any type and kind.

It will be apparent that in addition to conventional spectacle uses, the basic principles of my invention are applicable to the construction of other uses, such for example, as the movement of magnifying lenses into vision, and for doing close-up work of any type or kind, particularly by those who have occasion to use periodically through the day magnification lenses in inspecting or examining articles from time to time.

It will also be apparent that while in the present illustration the secondary lens is shown movable over the inner surface of the primary lens, it may also be arranged to move over the outer surface thereof by simply constructing the spectacle frame accordingly.

In moving the secondary lenses 15 into the raised or projected position, the lever 22 is simply moved along the lens frame, or in other words, the pivots 24 are moved upwardly through the grooves 26, and then upwardly through the grooves 31. In this connection it will be apparent that after the lens 15 has moved upwardly a slight extent, it is impossible for the lens to swing inwardly to a point rearwardly of the lens 14, as the frame 23 will engage the terminal end 18, as indicated in Fig. 2 of the drawing. The thickness of the lever 22 is within the limits of the frame 23, thus providing free swinging movement of the lens 15 when in its outwardly projected position, facilitating cleaning thereof.

Having fully described my invention, what I claim as new and desire to secure by Letters Patent is:

1. A pair of spectacles having primary lenses, a frame supporting each lens, said frame having at the peripheral edge thereof a projecting shield portion, a secondary lens normally supported on the frame within peripheral boundaries of said shield portion to be rendered invisible from at least one side surface of the spectacles, means movably supporting the secondary lens in connection with said frame useable in moving the secondary lens over one surface of the primary lens, said last named means comprising a sliding and pivotal mounting of the secondary lens on said frame useable in moving said secondary lens to predetermined focus position on the primary lens, means retaining the secondary lens in predetermined focal position with respect to said primary lens, and means for guiding the secondary lens in said frame to project the secondary lens beyond the limits of the frame including said shield portion.

2. In a pair of spectacles, a lens frame, a hood portion on the frame projecting from the periphery of the lens thereof, a primary lens in said frame, a secondary lens movable over one surface of the primary lens, means forming a single pivot for swingably moving the secondary lens into two focal stations on the primary lens, with the focal center of the secondary lens in a vertical plane through the focal center of the primary lens when in both of said stations, means for retaining the secondary lens against accidental displacement in each of said focusing stations, and means registering with said first named means providing for sliding movement of the secondary lens to dispose said secondary lens entirely within said hood portion when not in use.

3. In a pair of spectacles, a lens frame, a hood portion on the frame projecting from the periphery of the lens thereof, a primary lens in said frame, a secondary lens movable over one surface of the primary lens, means forming a single pivot for swingably moving the secondary lens into two focal stations on the primary lens, with the focal center of the secondary lens in a vertical plane through the focal center of the primary lens when in both of said stations, means for retaining the secondary lens against accidental displacement in each of said focusing stations, means supporting the secondary lens entirely with said hood portion when not in use, said hood portion having a peripheral opening, and means whereby said secondary lens may be extended beyond the limits of the frame and said hood portion through said opening.

4. The combination with a spectacle frame having a primary lens therein, of a secondary lens, means comprising a lever projecting from the periphery of the secondary lens and grooves in said frame for movably supporting the secondary lens in said frame, said secondary lens having pivot means slidable in said grooves in guiding the secondary lens in said frame, said grooves including a pivot socket arranged on the frame in horizontal alinement with the focal center of the primary lens, and said secondary lens being swingable on the pivot means arranged in said pivot socket into two different focusing positions on said primary lens.

5. The combination with a spectacle frame having a primary lens therein, of a secondary lens, means comprising a lever projecting from the periphery of the secondary lens and grooves in said frame for movably supporting the secondary lens in said frame, said secondary lens having pivot means slidable in said grooves in guiding the secondary lens in said frame, said grooves including a pivot socket arranged on the frame in horizontal alinement with the focal center of the primary lens, said secondary lens being swingable on the pivot means arranged in said pivot socket into two different focusing positions on said primary lens, and means retaining the secondary lens in each of said two positions with respect to the primary lens.

6. In bifocal spectacles employing primary and secondary lenses, a narrow lens frame for the primary lens, means in said frame supporting primary lenses, the periphery of the frame having an outwardly projected shield portion of such dimension as to conceal the secondary lenses when arranged adjacent the shield portions and beyond the limits of the primary lenses, said shield portions being arranged at the upper outer corner portion of the frame and of greater thickness than the remainder of the frame, and said shield portions having openings extending through the periphery thereof providing movement of the secondary lens inwardly and outwardly with respect to the frame and shield portions.

7. The combination with a spectacle frame having a primary lens therein, of a secondary lens, said secondary lens having a radially extending arm, pivot means on said arm, one side of the frame in alinement with the focal center of said primary lens having a pivot socket, said frame having grooves extending in opposite directions from said pivot socket, said pivot means being movable in said grooves in guiding the secondary lens into different positions with respect to said frame, and the secondary lens being swingable into two different focusing positions with respect to the primary lens when said pivot means of the arm is in said pivot socket.

8. The combination with a spectacle frame having a primary lens therein, of a secondary lens, said secondary lens having a radially extending arm, pivot means on said arm, one side of the frame in alinement with the focal center of said primary lens having a pivot socket, said frame having grooves extending in opposite directions from said pivot socket, said pivot means being movable in said grooves in guiding the secondary lens into different positions with respect to said frame, the secondary lens being swingable into two different focusing positions with respect to the primary lens when said pivot means of the arm is in said pivot socket, and said frame having means housing the secondary lens in one position thereof.

9. The combination with a spectacle frame having a primary lens therein, of a secondary lens, said secondary lens having a radially extending arm, pivot means on said arm, one side of the frame in alinement with the focal center of said primary lens having a pivot socket, said frame having grooves extending in opposite directions from said pivot socket, said pivot means being movable in said grooves in guiding the secondary lens into different positions with respect to said frame, the secondary lens being swingable into two different focusing positions with respect to the primary lens when said pivot means of the arm is in said pivot socket, said frame having means housing the secondary lens in one position thereof, and said arm conforming substantially to the contour of said frame when the secondary lens is in the last mentioned position.

10. In spectacles of the class described, a frame, means in said frame for supporting a primary lens, said frame having a channel along the periphery thereof, said channel being formed by spaced walls arranged beyond the limits of the primary lens, a secondary lens, inner opposed surfaces of said spaced walls having grooves extending along said channel, pivot means on the secondary lens operating in said grooves, and said frame having a pivot socket for receiving said pivot means in swinging the secondary lens into alinement with the primary lens.

11. A pair of spectacles having primary lenses, a frame supporting each lens, said frame having at the peripheral edge thereof a projecting shield portion, a secondary lens, means movably supporting the secondary lens in connection with said frame, said means comprising a pivot on the secondary lens slidably engaging the frame to move into different positions thereon, said secondary lens being normally supported within peripheral boundaries of said shield portion to be rendered invisible from at least one side surface of the spectacles in one pivot position thereof, said secondary lens being movable into focal position with respect to said primary lens in another pivot position thereof, and said secondary lens being movable into another pivot position in the frame providing for movement of the secondary lens into position exposing the secondary lens beyond said frame to facilitate cleaning thereof.

SAMUEL J. BLUMENTHAL.